United States Patent [19]
Mercat

[11] Patent Number: 5,016,478
[45] Date of Patent: May 21, 1991

[54] METHOD FOR MEASURING THE TORQUE TRANSMITTED TO THE DRIVING WHEEL OF A CYCLE OR LIKE VEHICLE AND A DEVICE FOR CARRYING OUT SAID METHOD

[75] Inventor: Jean-Pierre Mercat, Chateau-Renault, France

[73] Assignee: Ste Look, Nevers, France

[21] Appl. No.: 482,971

[22] Filed: Feb. 22, 1990

[30] Foreign Application Priority Data

Feb. 28, 1989 [FR] France ................................. 8902558

[51] Int. Cl.$^5$ ............................................... G01L 3/14
[52] U.S. Cl. ............................... 73/862.19; 73/862.54; 272/73
[58] Field of Search ........... 73/862.19, 862.48, 862.54, 73/379; 272/73, DIG. 5, DIG. 6

[56] References Cited

U.S. PATENT DOCUMENTS 4,015,468 4/1977 Simon ............................... 73/862.48
4,281,539 8/1981 Keller ............................... 73/862.54

FOREIGN PATENT DOCUMENTS 0270439 6/1988 European Pat. Off. ..
3150149 6/1983 Fed. Rep. of Germany .
3408497 9/1984 Fed. Rep. of Germany .
3330525 3/1985 Fed. Rep. of Germany .
3429805 2/1986 Fed. Rep. of Germany .

Primary Examiner—Charles A. Ruehl
Attorney, Agent, or Firm—Young & Thompson

[57] ABSTRACT

Detectors consisting of electric strain gages placed on one end of a bicycle wheel spindle and incorporated in the wheel hub are connected to an electric circuit which includes an apparatus for indicating the value of torque transmitted by the wheel. The strain gages can be influenced only by variations in the force applied to the spindle end in the horizontal plane which passes through the center of the spindle. There is thus measured only the horizontal component of the shearing force applied to the wheel spindle, from which it is possible to deduce the value of torque transmitted to the wheel. Instead of being fixed directly on one end of the wheel spindle, the strain gages can be fixed on a member which is associated with the spindle end, the member being capable of bending or undergoing deformation in the horizontal plane which passes through the center of the wheel spindle.

7 Claims, 4 Drawing Sheets

FIG. 8
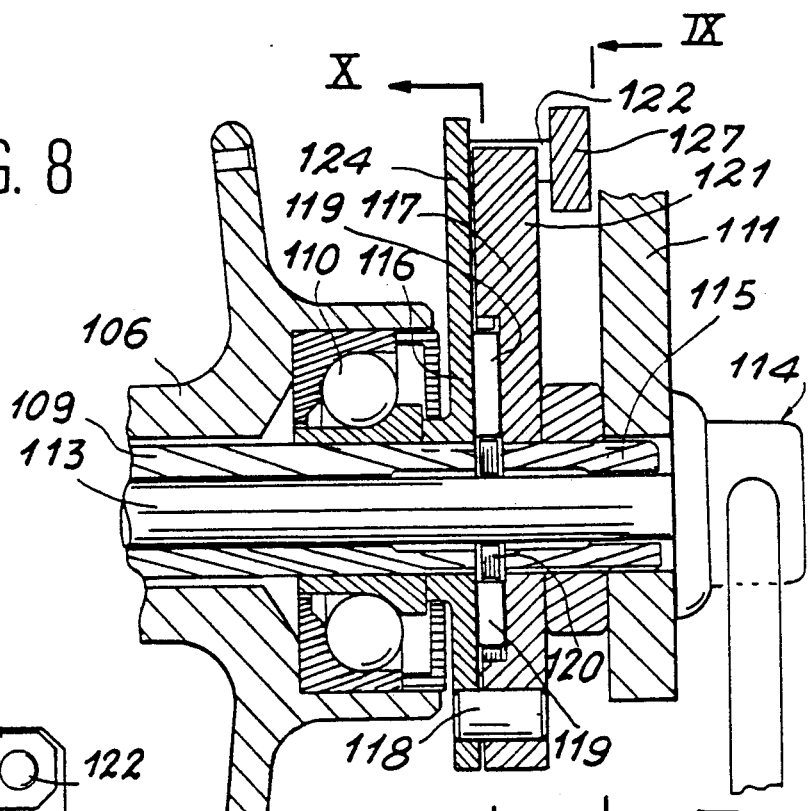
FIG. 9
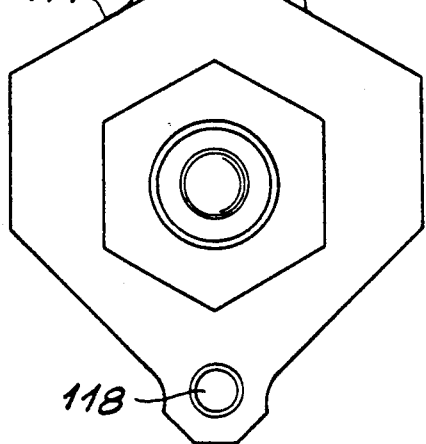
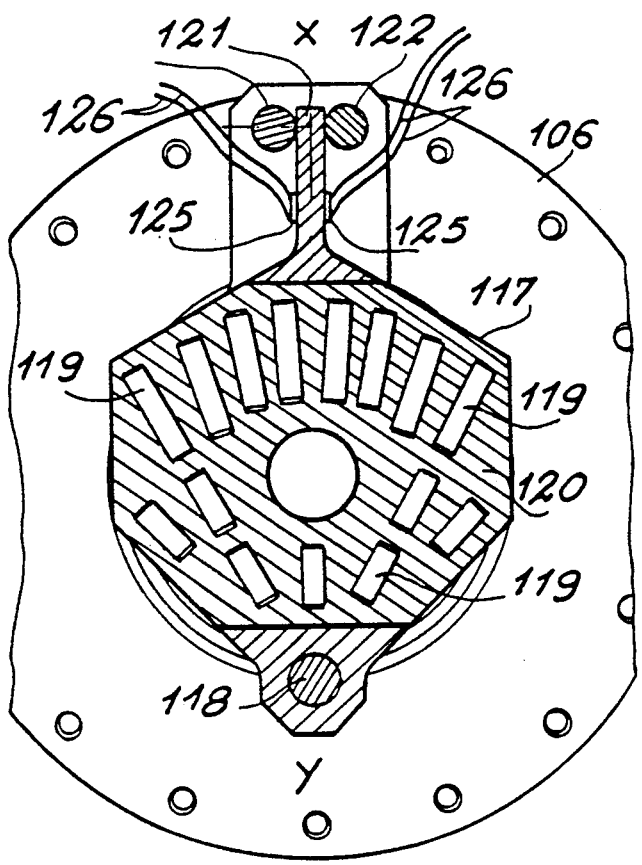
FIG. 10

METHOD FOR MEASURING THE TORQUE TRANSMITTED TO THE DRIVING WHEEL OF A CYCLE OR LIKE VEHICLE AND A DEVICE FOR CARRYING OUT SAID METHOD

BACKGROUND OF THE INVENTION

The present invention relates to measurement of the torque transmitted by a driving wheel and in particular the driving wheel of a cycle.

This measurement is of primary interest in a number of cases and is thus essential in the case of a racing cyclist in the course of training, for example. However, such a measurement is also very useful in the case of persons who ride a bicycle for physical reeducation or else in order to improve their physical condition.

It is for this reason that there already exist a certain number of devices for measuring the torque transmitted by a driving wheel. Thus German patent No. 3,150,149 mentions several systems designed for this purpose. More particularly, this patent describes a system for measuring said torque by first determining the torsion of the wheel hub between a driving portion and a driven portion of this latter, this torsion being produced by the action of the transmitted torque. To this end, said system comprises means designed to carry out an optical measurement of the degree of torsion. However, this is a relatively complex and costly solution which is attended by a certain number of disadvantages. This system is thus particularly cumbersome by reason of the optical measuring elements which are present. Moreover, the electric power consumption of this system is far from being negligible. Finally, by virtue of the very great similarity which exists between the driving portion and the driven portion of the hub, the angular differences between these two portions are very small, with the result that precise measurements are not permitted.

For these reasons, the present invention is concerned with a method and a device which are so designed as to carry out measurement of the torque transmitted to a driving wheel without encountering the disadvantages set forth in the foregoing.

SUMMARY OF THE INVENTION

The method of measurement in accordance with the invention makes use of detector elements which are incorporated in the hub of the corresponding driving wheel and which are connected to an electric circuit comprising an apparatus for indicating the value of the measured torque. However, the distinctive features of this method lie in the fact that electric strain gages are employed as detector elements and disposed on one end of the spindle of the corresponding wheel or on a member mounted on said spindle end, said strain gages being placed in such a manner as to ensure that they can be influenced only by variations in the force applied to said spindle end in the horizontal plane which passes through the center of the wheel spindle in order to measure solely the horizontal component of the shearing force applied to said spindle, thus making it possible to deduce therefrom the value of torque transmitted to said wheel.

In fact, the method under consideration makes profitable use of the fact that the actions of the driving wheel on the frame of a cycle have components in the three directions and that the components located in a plane parallel to the ground are related solely to the tension of the chain and to the tangent reaction of frictional contact of the wheel on the ground. In consequence, the determination of the horizontal components exerted on either of the two lateral fork ends for fixing the driving wheel spindle makes it possible to deduce therefrom the torque transmitted by said wheel if the following geometrical parameters are taken into consideration: the distance between the two fork ends as well as the distance between the driving chain and the fork end located on the corresponding side.

In regard to the measuring device in accordance with the invention, this device is designed for the application of the method defined in the foregoing. To this end, and in accordance with a distinctive feature of said device, one end of the wheel spindle or a member which is mounted on the spindle end is adapted to carry strain gages so arranged that they can be influenced only by variations in the force applied in the horizontal plane which passes through the center of the spindle of the corresponding wheel, said strain gages being intended to measure only the horizontal component of the shearing force applied to the wheel spindle, thus making it possible to deduce therefrom the value of torque transmitted to said wheel.

It should be noted that, in the definition of the method and of the device in accordance with the invention, the expression "electric strain gages" designates all types of force transducers or deformation transducers which are capable of delivering an electric signal having a value which is variable as a function of the magnitude of the forces or deformations detected. These transducers can operate in various ways, for example by variation of their resistivity, of their magnetic characteristics or of any other property, this variation being capable of introducing a modification of a predetermined characteristic in an electric circuit for utilization of the electric signal thus emitted by the corresponding detector or detectors.

In a particular embodiment of the device in accordance with the invention, the strain gages are four in number and mounted in pairs on two flat faces which extend in vertical planes on each side of the corresponding end of the wheel spindle, these gages being connected in a Wheatstone bridge.

In another embodiment, the end of the wheel spindle which comprises the measuring device is dissociated in two portions, namely a main portion which carries the wheel hub and an end portion which is intended to be fixed on the wheel support, these two portions being connected together by means of a coupling member which is capable of displacement substantially in a horizontal plane or of undergoing deformation in this plane under the action of a force applied in said plane, the strain gage or gages of the measuring device being mounted on said member in such a manner as to detect the forces applied solely in a horizontal plane.

BRIEF DESCRIPTION OF THE DRAWINGS

FIG. 8 is a view which is similar to FIG. 4 but which shows another embodiment of the device in accordance with the invention.

FIGS. 9 and 10 are views in sectional elevation along the respective planes IX—IX and X—X of FIG. 8.

DESCRIPTION OF THE PREFERRED EMBODIMENTS

Figure 1:
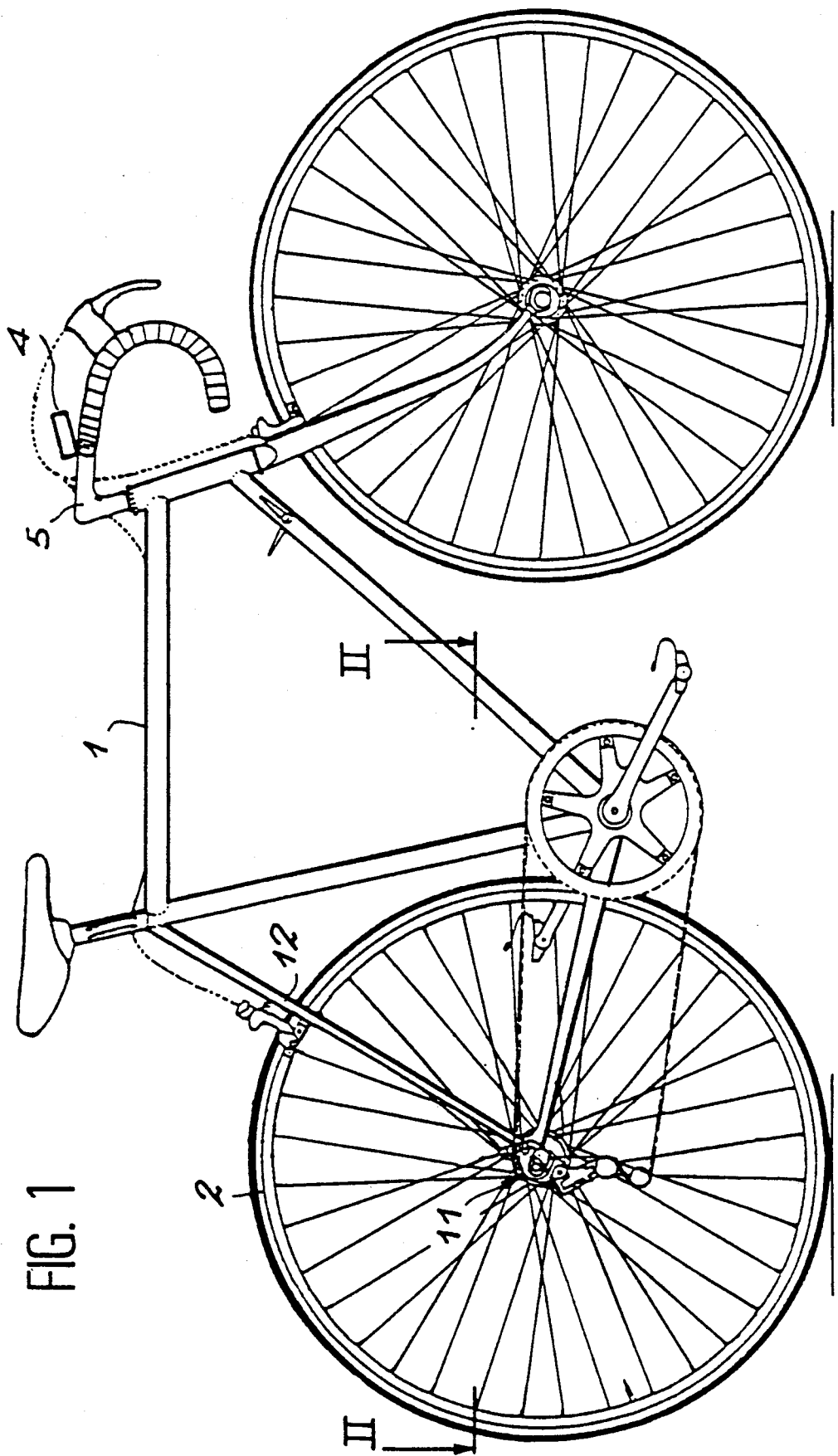
FIG. 1 is a view in side elevation of a bicycle, the driving wheel of which is equipped with a measuring device in accordance with the invention.

The bicycle 1 shown in FIG. 1 has a driving rear wheel 2 which is equipped with a device for measuring the transmitted torque by carrying out the method in accordance with the invention.

Figure 2:
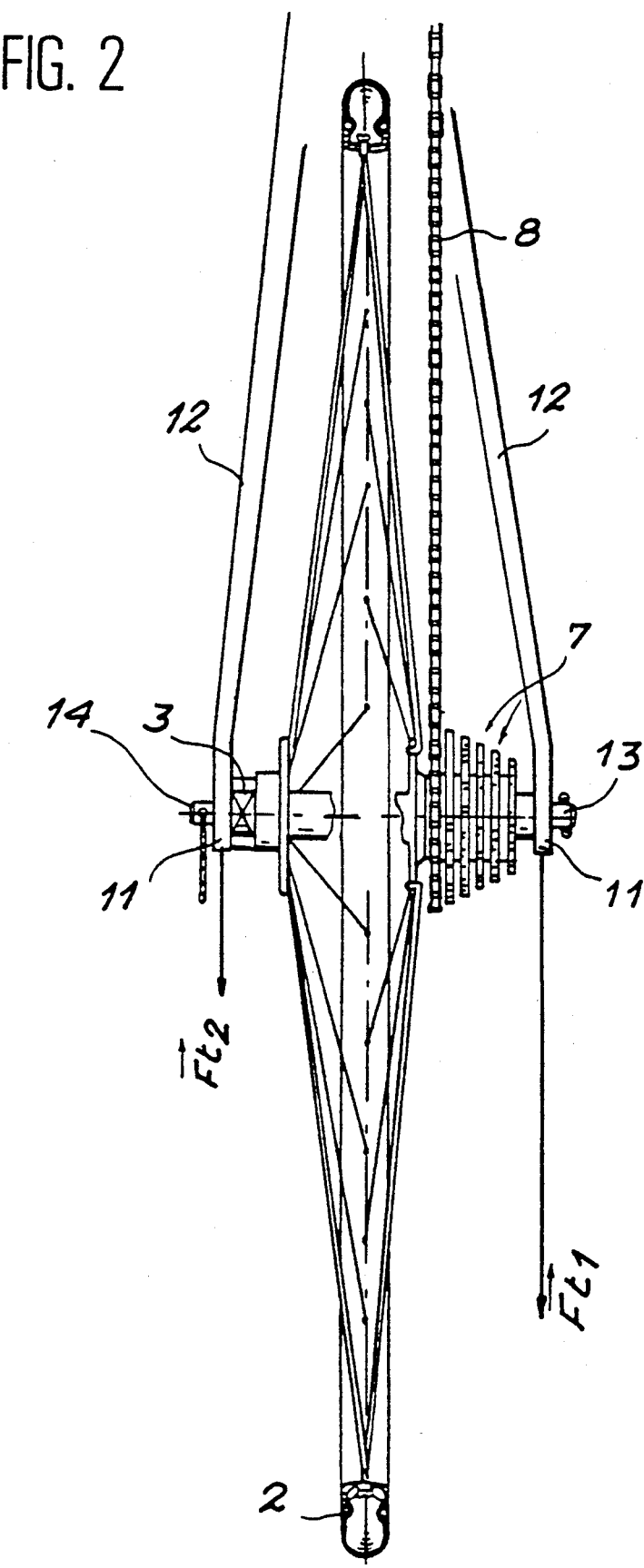
FIG. 2 is a partial horizontal sectional view taken along the line II—II of FIG. 1.
Figure 3:
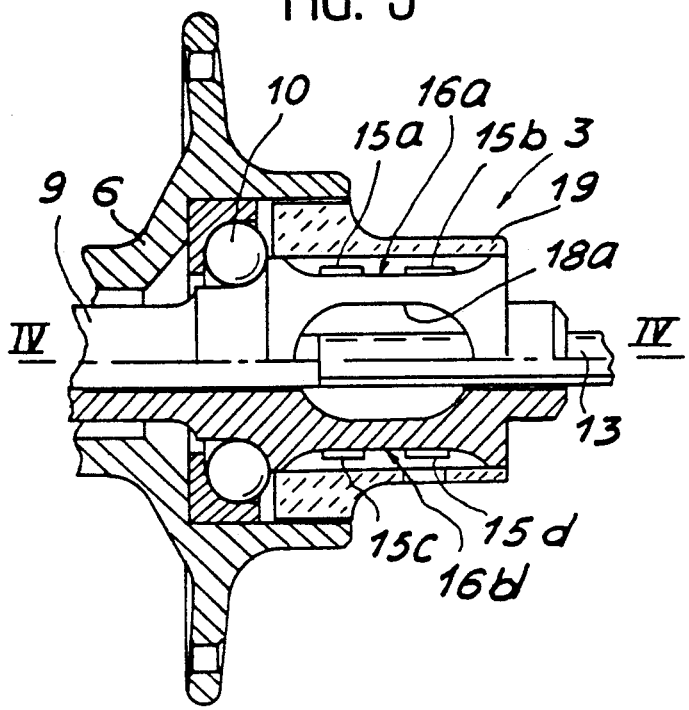
FIG. 3 is a partial sectional view of the left end of the wheel spindle taken along the same horizontal plane as the cross-section of FIG. 2 but looking from underneath and drawn to a different scale.

It is apparent from FIG. 2 that said device is located at the left end of the wheel spindle and is designated by the general reference 3. Moreover, said device is connected by means of electric conductors to a small casing 4 which is mounted on the bicycle handlebar 5 and which contains means for processing information derived from the detection means provided in the measuring device in accordance with the invention. Said casing is also provided with a screen for displaying the results obtained.

In accordance with customary practice, the right end of the hub 6 of the rear wheel 2 carries one or a number of pinions 7 on one of which is engaged the driving chain 8. Said hub is rotatably mounted on a hollow spindle 9 with interposition of bearings 10 provided at both ends. The ends of said spindle are engaged within receiving notches formed in end forks 11 provided on each side of the wheel and carried by the lower ends of the two arms 12 of the rear fork. Locking in position is ensured by means of a rod 13 which is engaged within the spindle 9 and one end of which carries a lock-nut 13 whilst its opposite end is provided with a rapid locking lever 14 with eccentric.

In the particular embodiment shown in FIGS. 3 to 7, the measuring device 3 has strain gages which are fixed against one end of the spindle 9 of the wheel 2, namely its left end in the case considered. However, by reason of the small bulk of this device, it could equally well be provided on the right end of said spindle.

Figure 5:
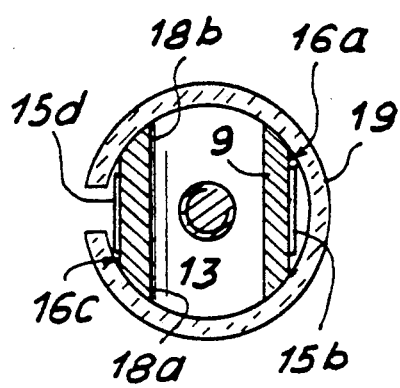
FIG. 5 is a vertical sectional view taken along the transverse plane V—V of FIG. 4.
Figure 4:
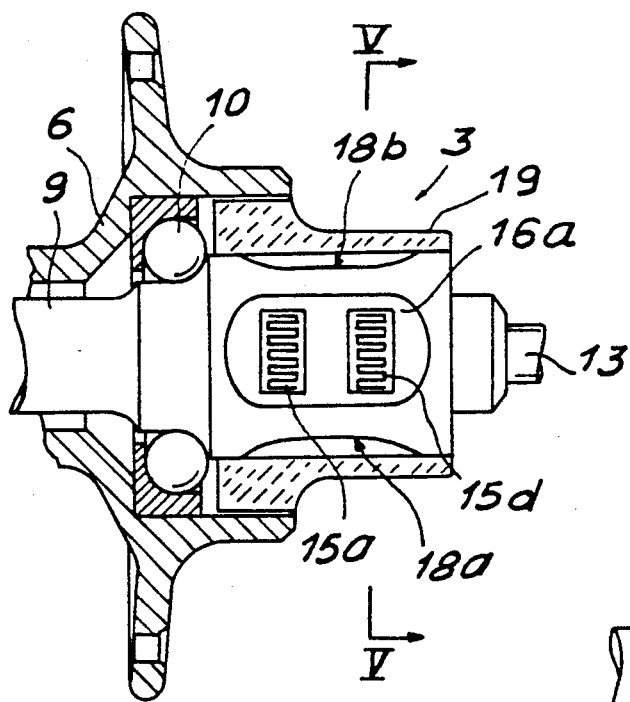
FIG. 4 is a vertical sectional view taken along the plane IV—IV of FIG. 3.
Figure 6:
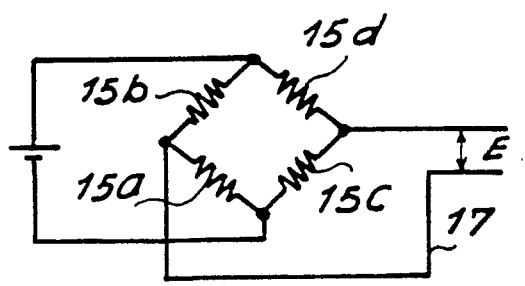
FIG. 6 is a circuit diagram of the strain gages provided in the device shown in the preceding figures.

Said device comprises four strain gages 15a, 15b, 15c and 15d. These gages are mounted in pairs on two flat faces 16a and 16d formed on each side of the corresponding end of the spindle 9 and extending on this latter in two vertical planes (as shown in FIG. 5). These strain gages are connected to each other in the form of a Wheatstone bridge in a circuit 17 (see FIG. 6) which terminates in the indicating apparatus 4 mentioned earlier.

Figure 7:
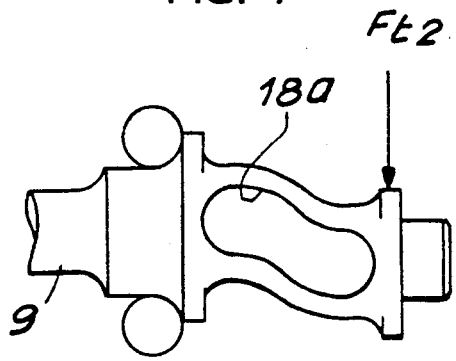
FIG. 7 is a diagram corresponding to the view of FIG. 3 but illustrating a purposely exaggerated deformation of the corresponding end of the wheel spindle.

By reason of the arrangement provided, the signal E obtained at the output of the circuit 17 is proportional to the force Ft2 applied to the corresponding end of the spindle 9 in a horizontal plane which passes through the center of said spindle. On the other hand, said signal is completely independent of the other forces such as bending moments, and so on. This results from the fact that the gages are placed in vertical planes and that they are connected to each other in the form of a Wheatstone bridge, thus permitting electrical isolation of the horizontal component of the shearing force applied to the corresponding end of the wheel spindle. Furthermore, the deformation sustained by the end of the wheel spindle under the action of the transmitted torque is shown in FIG. 7 but purposely very exaggerated.

In order to facilitate flexural deformation of the end portion of said spindle in a horizontal plane, suitable cut-out recesses 18a and 18b can be formed respectively at the top and at the bottom of said spindle. Said cut-out recesses cause deformation of the corresponding end of the spindle 9 under the action of the transmitted torque in a manner which is improperly designated as a "deformable parallelogram". This accordingly facilitates the measuring operation to be performed. In order to protect the present device and to guard against any risk of disturbance of measurements, a sleeve 19 of flexible material is advantageously mounted on the corresponding end of the spindle 9.

As already mentioned, it is a very easy matter to obtain by means of the device under consideration a signal E which is representative of the horizontal component Ft2 of the stresses sustained by the corresponding fork end 11 which forms part of the bicycle frame. The value of transmitted torque can in fact be readily determined from this datum. In the case of a bicycle having a single rear pinion, that is to say in the case of a track cycle, this computation can be directly established by the information means contained in the casing 4.

On the other hand, when the bicycle is of the normal racing type in which the driving wheel has six or seven pinions, the value of the transmitted torque can be determined only by taking into account the identification of the pinion which is in service and the number of teeth of said pinion. It is necessary in that case to provide a system for detecting the position of the gear-shift derailleur and to connect this system to the measuring casing 4 in order to take into account the information thus received. However, this slight complication is removed in the case of a racing cycle equipped with a speed variator instead of a derailleur gearshift.

As has already been stated, FIGS. 8 to 10 illustrate another embodiment of the measuring device in accordance with the invention.

This embodiment differs from the preceding in the fact that it is so designed as to virtually isolate mechanically the force to be measured or in other words the horizontal component of the shearing force applied to the corresponding end of the wheel spindle.

To this end, said spindle is dissociated in two portions, namely a main portion 109 and a complementary portion 115. This latter constitutes the left end of said spindle, which is engaged in the corresponding fork end 111. In regard to the main portion 109 of said spindle, this portion extends over the entire length of the hub and its opposite end is directly engaged in the corresponding fork end 111.

For the measurement to be performed, provision is made for a device comprising two plates 116 and 117 placed vertically in oppositely-facing relation and rigidly coupled for rotation with each portion 109 and 115 of the wheel spindle. These two plates are pivoted to each other by means of a common pin 118 which is parallel to the wheel spindle. Provision is made between these two plates for a series of steel rollers 119 mounted for free rotational motion within housings formed in a small plate 120 which virtually serves as a mounting support for said rollers. By virtue of the presence of these steel rollers, the two plates 116 and 117 are capable of practically frictionless angular displacement with respect to each other in spite of the compression produced by the force exerted by the rod 113 for locking the wheel spindle.

Now the outer plate 117 of the device carries a projecting tongue 121, the end of which is placed between two studs 122 and 123 carried by a rigid lug 124 which is integral with the second plate 116 of the device. It should be noted that the tongue 121 is located in a plane X-Y which passes through the axis of the assembly and on which is also located the center of the pivot-pin 118 of the two plates 116 and 117. Moreover, in order to ensure that the present device is capable of measuring the horizontal component Ft2 of the forces applied to the corresponding end of the wheel spindle, said plane X-Y must be perpendicular to the ground.

In order to carry out this measurement, the tongue 121 is so designed as to be elastically deformable. To this end, the corresponding plate 117 is of steel and the same applies to the other plate 116 of the device, said tongue 121 being of sufficiently small thickness to be elastically deformable. Thus, when the wheel is driven in rotation by the effort of the cyclist and the hub 106 tends to rotate in the direction of the arrow F, this tends to apply the stud 122 against the free end of the tongue 121. This results in bending of the tongue body as a direct function of the magnitude of the force Ft2 to be measured.

In order to perform this measurement, strain gages 125 are provided on both faces of the deformable tongue 121. These strain gages are connected by means of electric conductors 126 to the data-processing means provided within the casing 4 already mentioned. The design concept of the present device being taken into account, these gages detect the horizontal component Ft2 of the forces applied to the corresponding end of the wheel spindle. The value of the driving torque can thus be deduced therefrom as explained earlier. As can readily be understood, instead of providing two strain gages 125 on both faces of the deformable tongue 121, it would be possible to provide four gages, namely two gages on each face, these four gages being accordingly connected in a Wheatstone bridge.

Preferably, as is apparent from FIG. 9, the two studs 122 and 123 are coupled to each other by means of a strip 127 placed opposite to the end of the deformable tongue 121. Said strip thus ensures that the end of said tongue is maintained between the two studs 122 and 123.

As can readily be understood, instead of measuring the torque transmitted from the flexural deformation sustained by the vertical tongue 121, it would be possible to do so by determining the compressive force sustained by a deformable member which is placed in the horizontal direction and which would also form part of a coupling system between the two complementary portions 109 and 115 of the wheel spindle. A device of this type would serve both to determine the value of the horizontal component of the forces applied to one end of the wheel spindle and to deduce from this value the magnitude of the transmitted torque.

Many other solutions could be adopted in order to detect the magnitude of the force exerted in the horizontal direction between the two complementary portions 109 and 115 of the wheel spindle. In the example shown in FIGS. 8 to 10, the measuring device thus provided is associated with the left end of the wheel spindle. However, although a solution of this type is less practical, it would be perfectly possible to provide this device on the right end of said spindle in order to detect the value of the horizontal component Ft1 of the forces applied at this point.

Furthermore, the detection device in accordance with the invention could give rise to a large number of variants and other forms of construction which all permit the execution of the method of measurement set forth in the foregoing. As already mentioned, said method and said device are more particularly designed for measurement of the torque transmitted in the case of the driving wheel of a cycle. It should be added that the invention is also concerned with the cycles equipped with the measuring device considered. However, the method and the device in accordance with the invention could also be employed for measuring the torque transmitted by a driving wheel on a vehicle other than a cycle.

What is claimed is:

1. A method for measuring the torque transmitted to the driving wheel of a cycle or like vehicle by means of detector elements incorporated in the hub of said wheel and connected to an electric circuit comprising an apparatus for indicating the value of said torque, wherein electric strain gages are employed as detector elements and disposed on one end of the spindle of the corresponding wheel or on a member mounted on said spindle end, said strain gages being placed in such a manner as to ensure that they can be influenced only by variations in the force applied to said spindle end in the horizontal plane which passes through the center of the wheel spindle in order to measure solely the horizontal component of the shearing force applied to said spindle, thus making it possible to deduce therefrom the value of torque transmitted to said wheel.

2. A driving wheel of a cycle or like vehicle, comprising a measuring device including detector elements incorporated in the hub of said wheel and connected to an electric circuit comprising an apparatus for indicating the value of torque transmitted to said wheel, wherein one end of the wheel spindle or a member which is mounted on said spindle end carries strain gages which are influenced only by variations in the force applied in the horizontal plane which passes through the center of the spindle of the corresponding wheel, said strain gages measuring only the horizontal component of the shearing force applied to the wheel spindle, thus making it possible to deduce therefrom the value of torque transmitted to said wheel.

3. A driving wheel according to claim 2, wherein the strain gages are four in number and mounted in pairs on two flat faces which extend in vertical planes on each side of the corresponding end of the wheel spindle, said gages being connected in a Wheatstone bridge.

4. A driving wheel according to claim 3, wherein the end of the wheel spindle on which the strain gages are mounted has at least one cutout recess that facilitates flexural deformation of the end portion of the wheel spindle in a horizontal plane which passes through the center of said spindle.

5. A driving wheel according to claim 2, wherein the end portion of the wheel spindle which carries the measuring device is dissociated in two portions, namely a main portion which carries the wheel hub and an end portion which is fixed on a wheel support, these two portions being connected together by means of a coupling member which is displaceable or deformable substantially in a horizontal plane under the action of a force applied in said plane, the strain gages of the measuring device being mounted on said member in such a manner as to detect the forces applied solely in a horizontal plane.

6. A driving wheel according to claim 5, wherein the measuring device comprises two vertical plates disposed vertically in oppositely-facing relation and rigidly coupled for rotation with each portion of the wheel spindle, said two plates being pivoted to each other by means of a common pin which is parallel to the wheel spindle and being coupled together on the opposite side by means of a vertical tongue carried by one of said two plates and placed between two stops carried by the other plate, the strain gages being placed on said flexible coupling tongue.

7. A cycle equipped with a driving wheel according to claim 2, wherein said electric circuit is placed within a casing which is provided with a display dial and which is fixed on the handlebar of said cycle.

* * * * *